(12) United States Patent
Mahlme

(10) Patent No.: US 11,536,309 B2
(45) Date of Patent: Dec. 27, 2022

(54) SELF-PIERCING RIVET ELEMENT A COMPONENT ASSEMBLY COMPRISING THE RIVET ELEMENT AND A COMPONENT A METHOD FOR THE MANUFACTURE OF THE COMPONENT ASSEMBLY AND A DIE BUTTON

(71) Applicant: PROFIL Verbindungstechnik GmbH & Co. KG, Friedrichsdorf (DE)

(72) Inventor: Amer Mahlme, Bad Homburg (DE)

(73) Assignee: PROFIL Verbindungstechnik Gmbh & Co., KG, Friedrichsdorf (DE)

( * ) Notice: Subject to any disclaimer, the term of this patent is extended or adjusted under 35 U.S.C. 154(b) by 663 days.

(21) Appl. No.: 16/426,056

(22) Filed: May 30, 2019

(65) Prior Publication Data
US 2019/0368527 A1   Dec. 5, 2019

(30) Foreign Application Priority Data
May 30, 2018   (DE) .......................... 102018112964.5

(51) Int. Cl.
*F16B 19/08*   (2006.01)
*B21J 15/02*   (2006.01)
*F16B 5/04*   (2006.01)

(52) U.S. Cl.
CPC ........... *F16B 19/086* (2013.01); *B21J 15/025* (2013.01); *F16B 5/04* (2013.01)

(58) Field of Classification Search
CPC ................. F16B 37/065; F16B 37/068; Y10T 29/49956; Y10T 29/49963;
(Continued)

(56) References Cited

U.S. PATENT DOCUMENTS

| 5,067,224 A | 11/1991 | Muller |
| 9,849,549 B2 * | 12/2017 | Diehl .................... B23P 19/00 |
| 2008/0107499 A1 | 5/2008 | Denham |

FOREIGN PATENT DOCUMENTS

| DE | 10249030 A1 | 11/2003 |
| DE | 102012001068 A1 | 7/2013 |

(Continued)

OTHER PUBLICATIONS

English translation EP 2570685 (Year: 2013).*

*Primary Examiner* — Jason L Vaughan
*Assistant Examiner* — Amanda Kreiling
(74) *Attorney, Agent, or Firm* — Gregory J. Gore, Esq.

(57) ABSTRACT

A self-piercing rivet element is provided with a body part having a thread cylinder and with a hollow rivet section to be pressed into an as yet unpierced component. In this arrangement, the rivet section is designed to be at least regionally dilatable by means of a die button and tapers in the direction of the central longitudinal axis and away from the body part. The hollow rivet section has, in the region of the transition to the body part, a diameter, which is larger than the outer diameter of the thread cylinder. Furthermore, the rivet section has a closed peripheral wall and an opening at its free end which corresponds at least substantially in diameter to the core diameter of the thread cylinder. Furthermore a component assembly, a method for the manufacture of the component assembly and the die button are claimed.

9 Claims, 14 Drawing Sheets

Figure 2C:
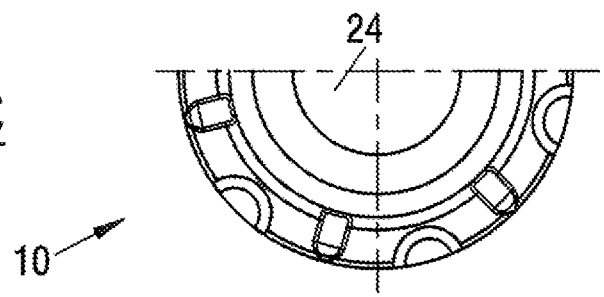

(58) Field of Classification Search
CPC ......... Y10T 29/49943; Y10T 29/49945; Y10T 29/49947; Y10T 29/49954; Y10T 29/5343
See application file for complete search history.

(56) References Cited

FOREIGN PATENT DOCUMENTS

| | | |
|---|---|---|
| DE | 102013217640 A1 | 3/2015 |
| DE | 102015104152 A1 | 11/2015 |
| EP | 1116891 B1 | 7/2001 |
| EP | 2570685 A1 * | 3/2013 ............. B21J 15/02 |
| EP | 2570685 A1 | 3/2013 |

* cited by examiner

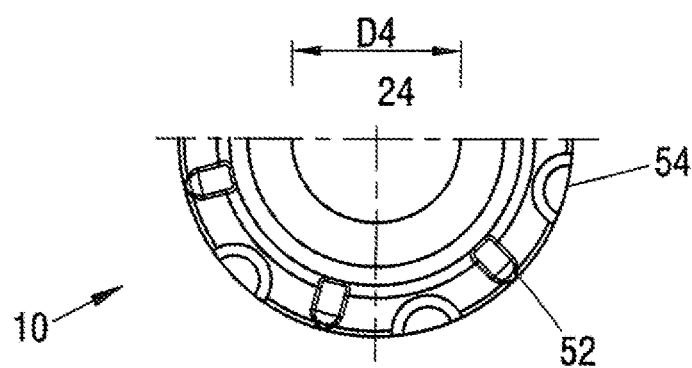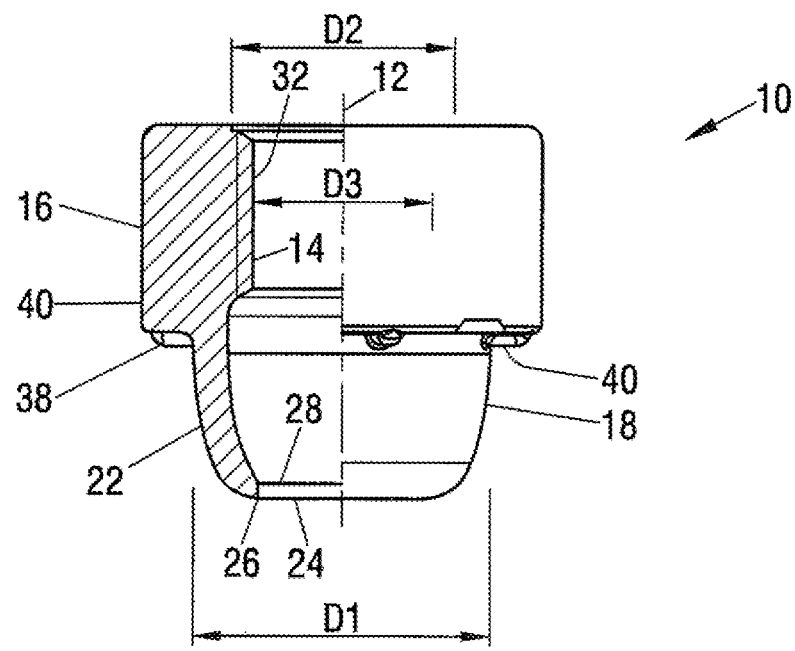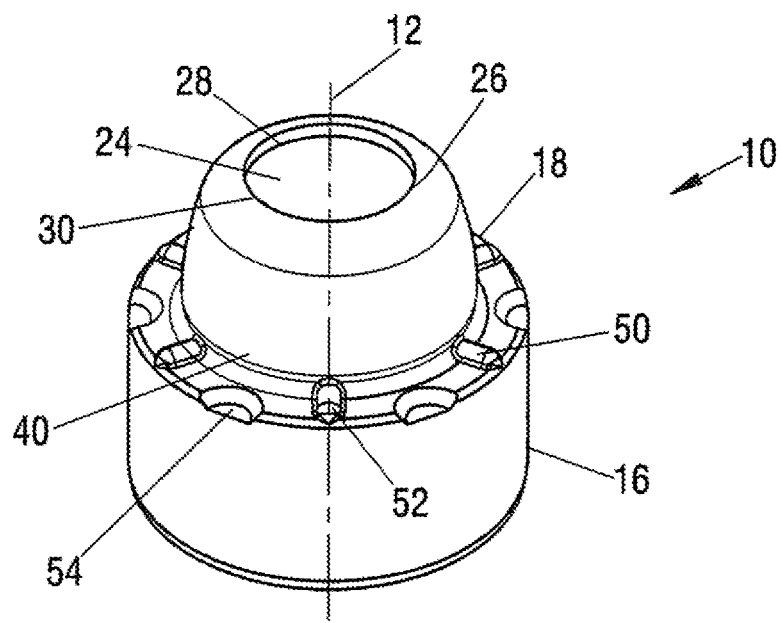

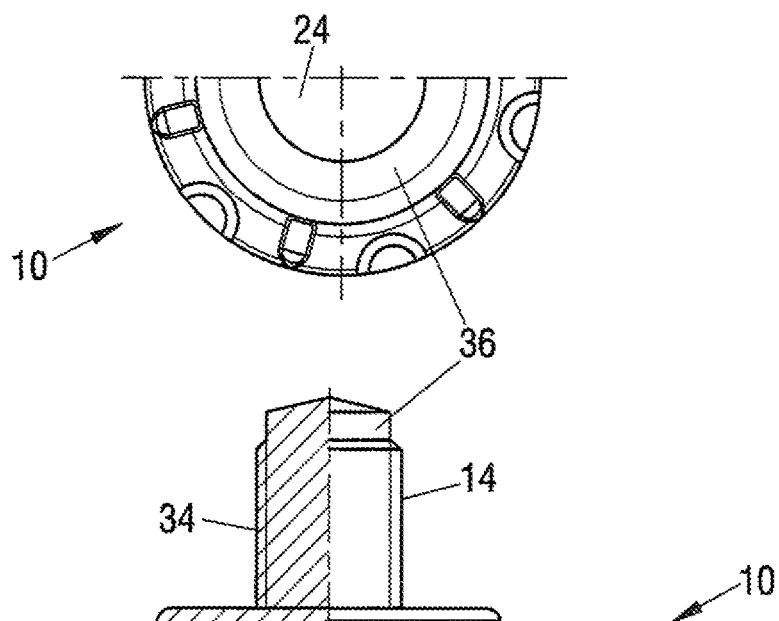
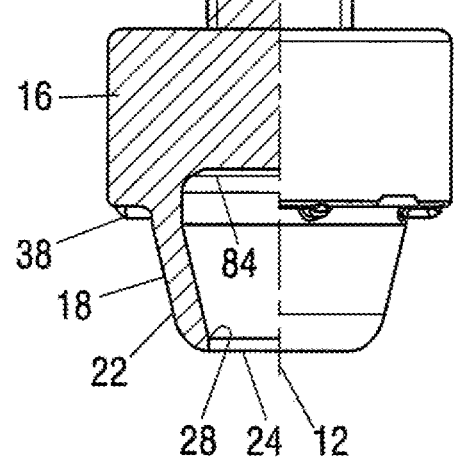
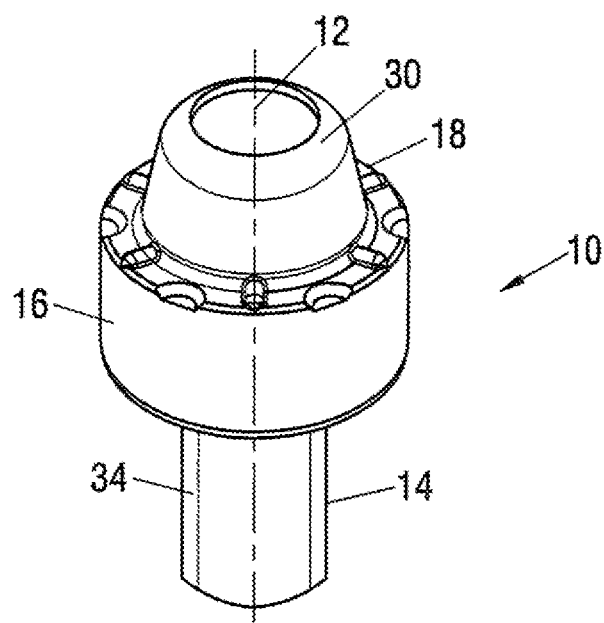

SELF-PIERCING RIVET ELEMENT A COMPONENT ASSEMBLY COMPRISING THE RIVET ELEMENT AND A COMPONENT A METHOD FOR THE MANUFACTURE OF THE COMPONENT ASSEMBLY AND A DIE BUTTON

The present invention relates to a self-piercing rivet element having a central longitudinal axis, a body part having a thread cylinder and a hollow rivet section for being pressed into a non-pre-pierced component, wherein the rivet section is formed at least regionally to be dilated by means of a die button and tapers in the direction of the central longitudinal axis away from the body part. Furthermore, the invention relates to a component assembly comprising the rivet element and a component, and also to a method for the attachment of the rivet element to the component and a die button suitable for this.

A rivet element of the initially named kind can be found in EP 2 570 685 of the present applicant. The rivet element is there provided for the self-piercing attachment to a component consisting of a fiber composite material. The designation "self-piercing" signifies that the rivet section of the rivet element is itself used to form an opening in the component by the exertion of a suitable pressure onto the head part of the rivet element while supporting the component on a suitable die button, i.e. the component is not pierced prior to the attachment of the rivet element in the region of the attachment of the rivet element, although it may be pierced at other positions.

In the embodiment of the rivet section in accordance with EP 2 570 685 the rivet element is formed, for the realization of the self-piercing function, as a spike which tapers in the direction of a tip, with the spike having at its tip an introduction aid for a die button, in particular a funnel-like introduction aid, the die button having its own tip and being designed to dilate the spike by movement into the funnel-like introduction aid. The rivet section has a substantially circular cross-section and consists of a plurality of segments, in particular tongue-like segments which jointly form the spike and which can be moved apart from one another on the dilation of the spike. Through the formation of a rivet section as a spike it is possible, on the attachment of the rivet element to a component of fiber composite material, to press the fibers apart from one another without seriously damaging them, whereby the strength of the component in the region of the attachment is enhanced.

The known rivet element is however not really suitable for being used with components of metal, i.e. with sheet metal parts. This has several reasons. On the one hand, the considerable degree of re-shaping of the sheet metal or displacement would be a serious problem and, on the other hand, the subdivision of the rivet section into segments makes the strength and the fatigue characteristics of the so formed component assembly questionable.

It has admittedly been occasionally proposed to attach a fastener element having a cylindrical rivet section in a self-piercing manner to a sheet metal part, this is however only satisfactorily achieved with bolt elements such as the SBF bolt elements of the company Profil Verbindungstechnik GmbH. For nut elements it is always problematic. For example, several proposals have been made to attach an RDN nut element of the company Profil Verbindungstechnik GmbH in a self-piercing manner to a sheet metal part. The handling of the piercing slug which arises is however always problematic because one requires a follow up punch in order to remove the piercing slug from the region of the nut element. Removal of the slug through the thread cylinder of the nut element is really problematic because the piercing slug is greater in diameter than the core diameter of the thread cylinder and the thread cylinder could thus be damaged.

The object underlying the present invention is to provide a self-piercing rivet element in which no serious problems arise with the removal of the piercing slug and which avoids the complication of a follow up punch and nevertheless enables a high quality attachment to a component, in particular to a sheet metal part.

In order to satisfy this object provision is made in accordance with the invention, in a rivet element of the initially named kind, for the hollow rivet section to have a diameter in the region of the transition into the body part which is larger than the outer diameter of the thread cylinder and also to have a closed peripheral wall and an aperture at its free end which corresponds in diameter at least substantially to the core diameter of the thread cylinder.

An alternative solution of the object which applies for nut elements, for bolt elements and for pure rivets, is characterized in that the hollow rivet section has a larger diameter in the region of the transition to the body part and a closed peripheral wall, with the rivet section achieving its smallest diameter at its free end and there having a circular opening, with the tapering of the rivet cylinder having an enclosed angle in the range between 20° and 100°, preferably between 30° and 60° and in particular between 40° and 50°. These angular values also apply to rivet elements in accordance with the invention in the form of nut elements and bolt elements as well as for pure rivet elements.

In this respect the rivet element can be a nut element having an internal thread which extends at least substantially coaxial to the central longitudinal axis, with the opening of the rivet section being made slightly smaller than the core diameter. As an alternative to a nut element the rivet element can be realized as a bolt element the body part of which is provided with a shaft part having an external thread which extends at least substantially coaxial to the central longitudinal axis, with the opening being able to be fractionally larger than the core diameter of the thread cylinder.

When realising the rivet element of the invention as a nut element or as a bolt element the rivet element is normally attached to a single component to form a component assembly and the thread cylinder of the rivet element then serves for the attachment of a further component to the component assembly by means of a threaded bolt or a nut which is respectively screwed into or onto the thread cylinder. It is however also possible for the nut element or the bolt element can be riveted in self-piercing manner to two or more components, i.e. sheet metal parts.

As a result of the design of the rivet section as a tapering part having a circular opening, the size of the opening determines the diameter of the slug and ensures that the slug can be kept sufficiently small so that it can be removed without problem through the thread cylinder of the nut element. This can for example take place by a blast of air or by gravity when the nut element is arranged during the attachment beneath the component or sheet metal part. Normally the nut element is held in a setting head and the setting head should then have a passage which enables the transporting way of the slug after it has been removed through the thread cylinder.

For a bolt element or a rivet the slug can be pressed against the base of the rivet section and can there be upset by means of a central post of the die button in such a way that it is fixedly clamped inside the rivet section. The slug then reinforces the connection between the nut and rivet element and the component or components. The use of a follow up punch to remove the slug is not necessary and the self-piercing attachment of the rivet element to the component or sheet metal part takes place in one stroke of the press which normally is used for the attachment of the rivet elements. A press is however not essential for the attachment of the rivet element. For this a robot or a power-operated pair of tongs could be used in known manner.

In one embodiment the outer side of the peripheral wall of the rivet section is at least substantially convexly rounded when cut in a longitudinal plane. This shape can be relatively easily manufactured in a cold heading operation from an initially cylindrical rivet section.

As an alternative the outer side of the peripheral wall of the rivet section can extend at least substantially conically. A shape of this kind is significantly stiffer and favours the self-piercing function of the rivet section.

The peripheral wall of the rivet section preferably has an at least substantially constant wall thickness apart from the transition into the head part and at its free end.

The side of the body part adjacent to the transition into the rivet section is formed as a flange and can be provided with features providing security against rotation. This is particularly favourable when the rivet element is realized as a nut element or as a bolt element.

The component assembly in accordance with the invention consists of a rivet element in accordance with one of the above described inventive types in combination with a component, in particular with a metallic component or a sheet metal part wherein, when designed as a nut element, the piercing slug arising through the self-piercing introduction of the rivet element in the region of the opening is disposed of through the hollow thread cylinder and, when formed as a bolt element of the rivet, the piercing slug arising in the region of the opening is accommodated in upset manner in the hollow rivet section adjacent to the body part. In this arrangement the component or the components are firmly clamped between the rivet bead and a flange formed by the body part.

The rivet section of the rivet element shaped into a rivet bead is preferably accommodated within a boss of the component, i.e. the body part of the nut element sits on the raised side of the boss. This embodiment leads, on the one hand, to a desired stiffening of the sheet metal part in the region of the attachment of the rivet element and, on the other hand, the accommodation of the rivet bead within the boss is favourable for the attachment situation when, with a nut element, a further component is attached to the so formed component assembly by means of a bolt. In this connection the rivet bead should only have a small spacing, for example 0.02 mm, from the plane of the sheet metal part outside of the boss in order to provide a planar attachment surface for the further component.

A method for the attachment of a rivet element in accordance with the invention to a component or sheet metal part using a die button against which the sheet metal component is braced is characterized in that the die button is provided with a central post having a cylindrical region with an outer diameter which corresponds to the inner diameter of the opening and with which, on the exertion of pressure onto the rivet element in the direction towards the component and the die button serves for the piercing of a slug which is pressed into the hollow rivet section, in that the cylindrical region of the central post is followed by a region diverging in diameter away from the cylindrical region which serves for a dilation of the hollow rivet section and in that the divergent region of the central post merges into a U-shaped recess which, after the piercing of the component and the dilation of the rivet section, and on the exertion of further pressure on the rivet element, shapes the rivet section into a rivet bead.

A method of this kind can be realized simply in one stroke of a press and does not require the provision of a follow up punch.

It is particularly favourable when the body part of the rivet element is accommodated in a hollow cavity of the setting head which merges via a recess in the form of a depression forming a boss into the flat end face of the setting head, whereby through the exertion of pressure on the rivet element by means of the setting head, the component is locally shaped into the form of a boss. For this purpose the U-shaped recess preferably merges at its radially outer side into a raised ring portion surrounding this recess which, together with the depression of the setting head, serves for the formation of the boss.

The die button of the invention for the self-piercing attachment of a rivet element into the component or sheet metal part, in particular using a method described above, is characterized in that the die button has a central post having a cylindrical region provided with an outer diameter which corresponds to the inner diameter of the opening of the rivet section of the rivet element and serves, on the exertion of pressure on the rivet element in the direction towards the component, and the die button for the punching out of a slug, in that the cylindrical region of the central post is followed by a region which diverges away from the diameter of the cylindrical region and which serves for the dilation of the hollow rivet section and in that the divergent region of the central post merges into a U-shaped recess which, after the piercing of the component and the dilation of the rivet section shapes the rivet section into a rivet bead by the exertion of further pressure on the rivet element. In this respect the central post can be so formed at its free end that, with a bolt element or a rivet, the slug is so upset against the base of the head part and so increased in its diameter that it is clamped in a manner secured against loss within the rivet section.

It is particularly favourable when the U-shaped recess merges at its radially outer side into a raised ring which surrounds the recess. In this way a clean shaping of the boss can be achieved as the sheet metal part can be deformed to fully line the depression of the setting head.

Figure 2B:
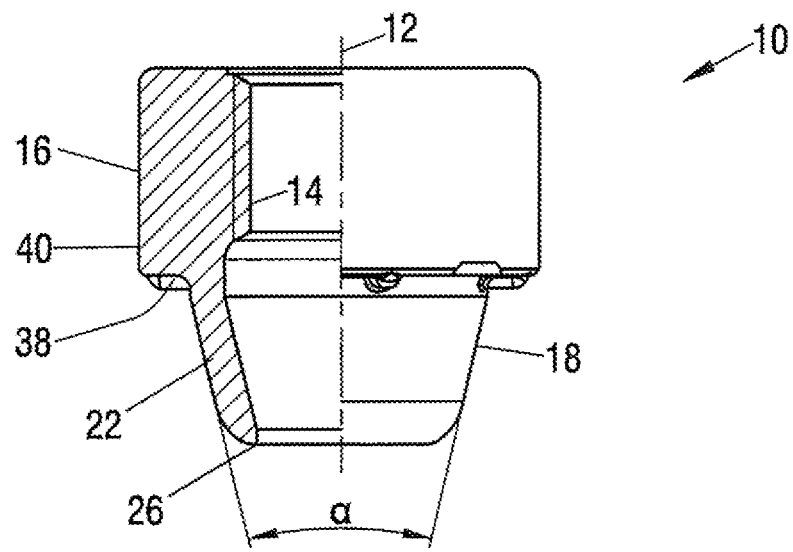
Figure 2A:
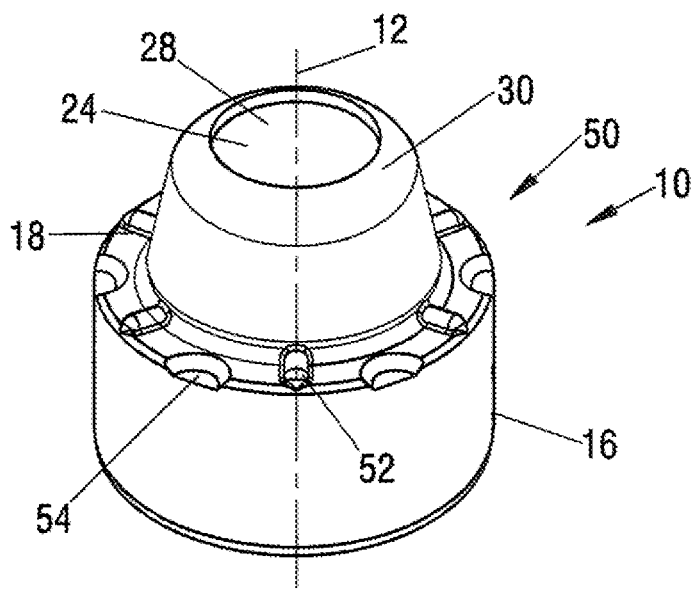
Figure 3A:
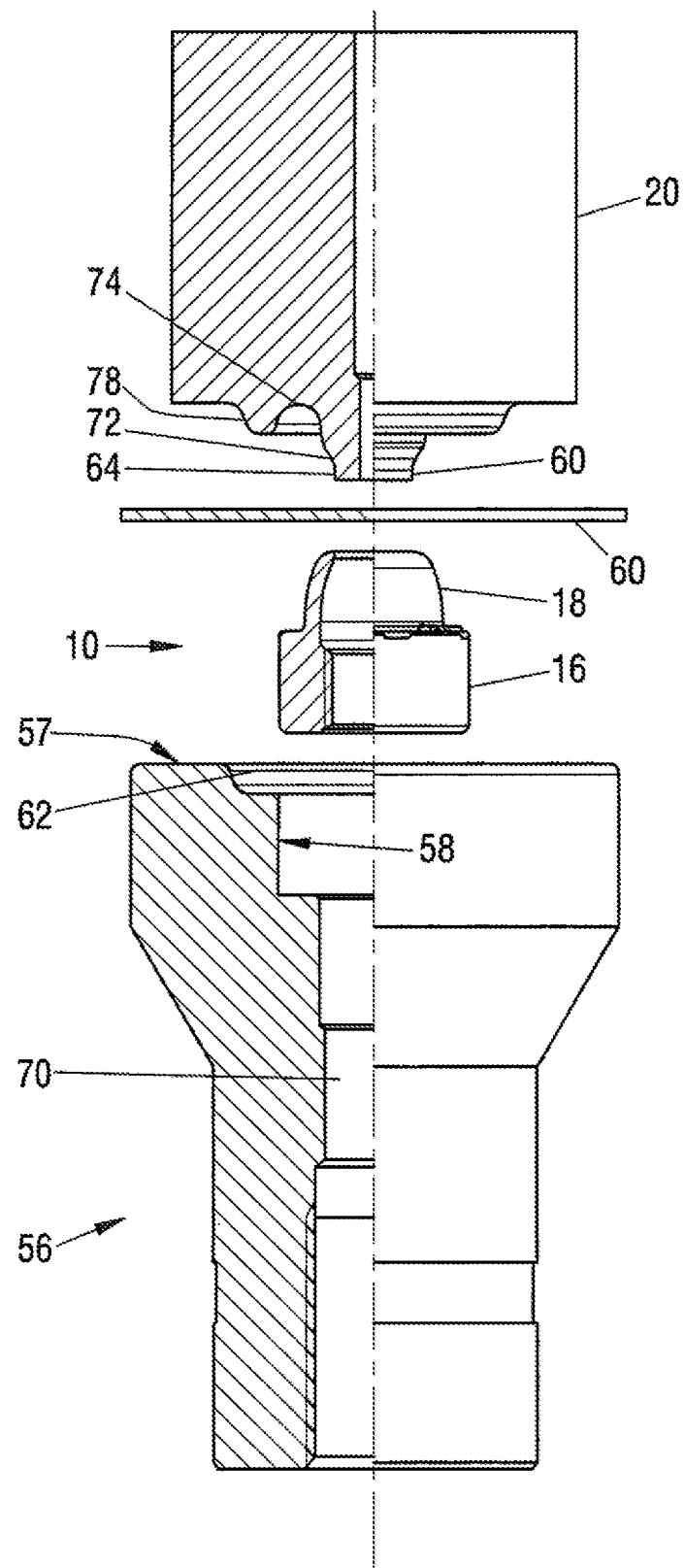
Figure 3B:
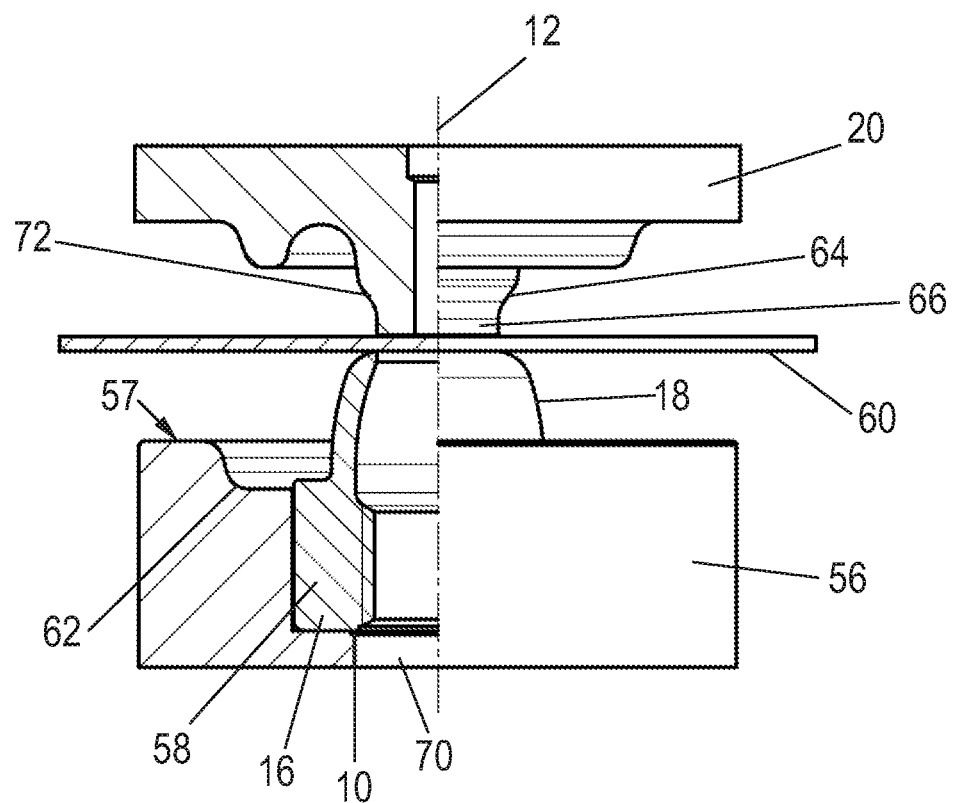
Figure 3C:
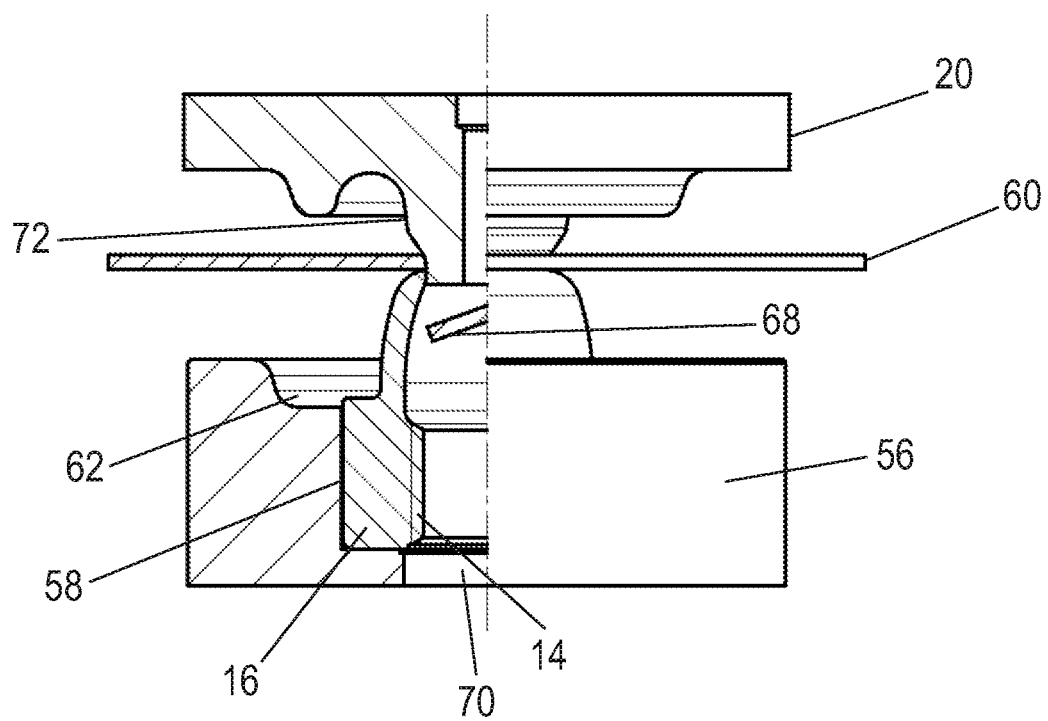
Figure 3D:
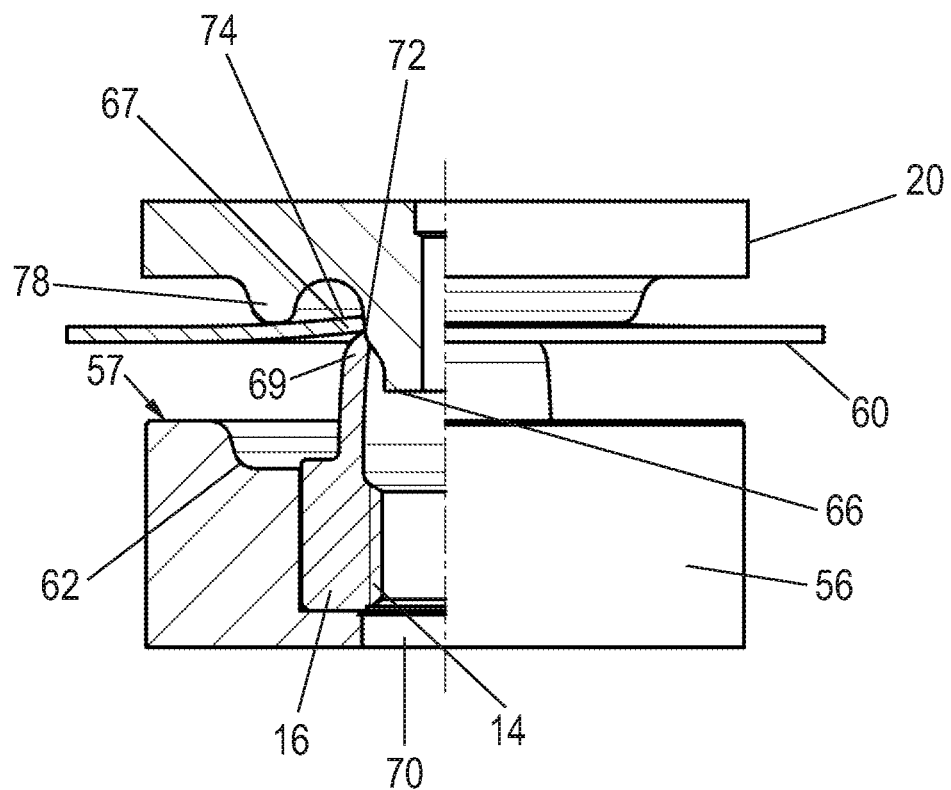
Figure 3E:
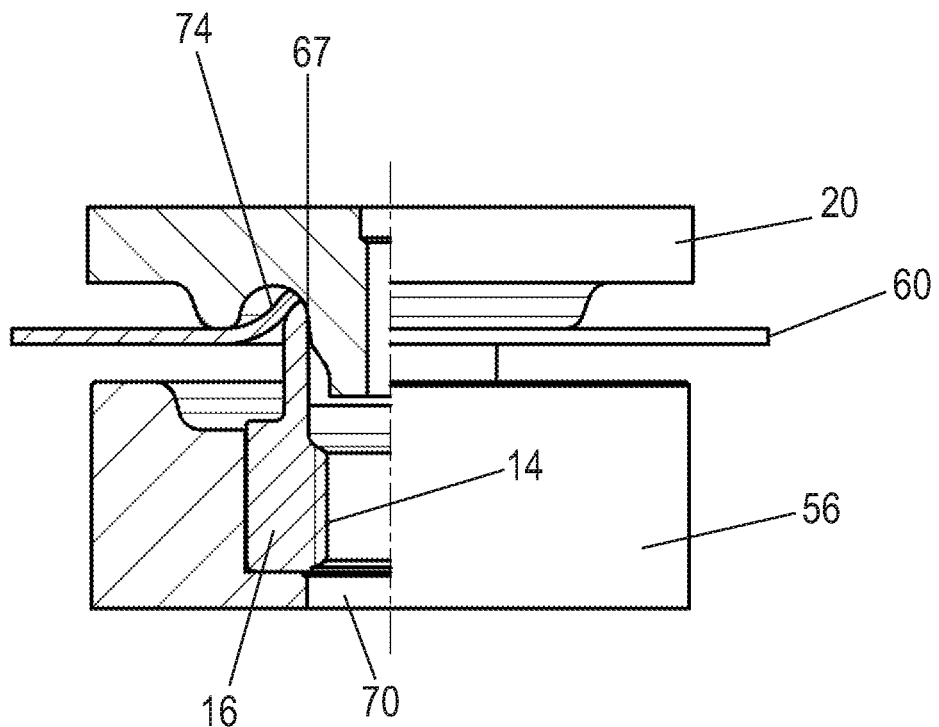
Figure 3F:
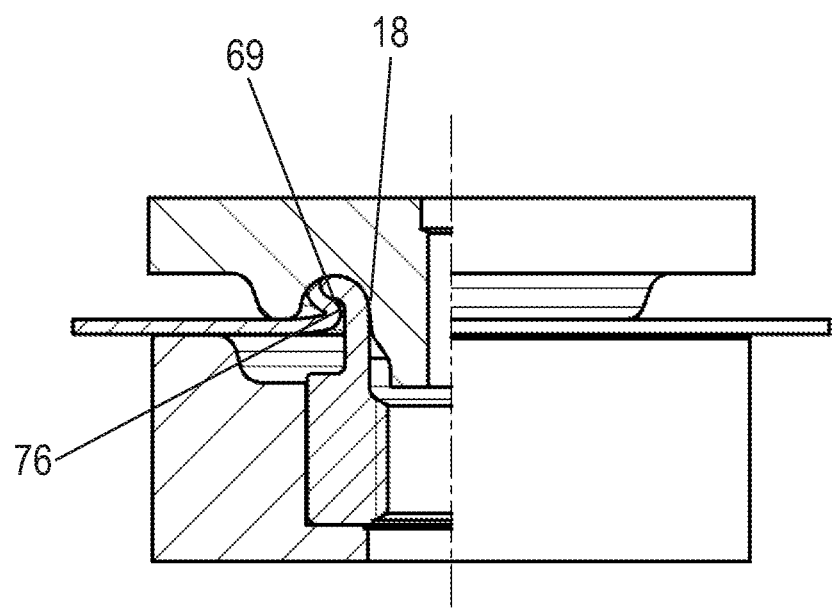
Figure 3G:
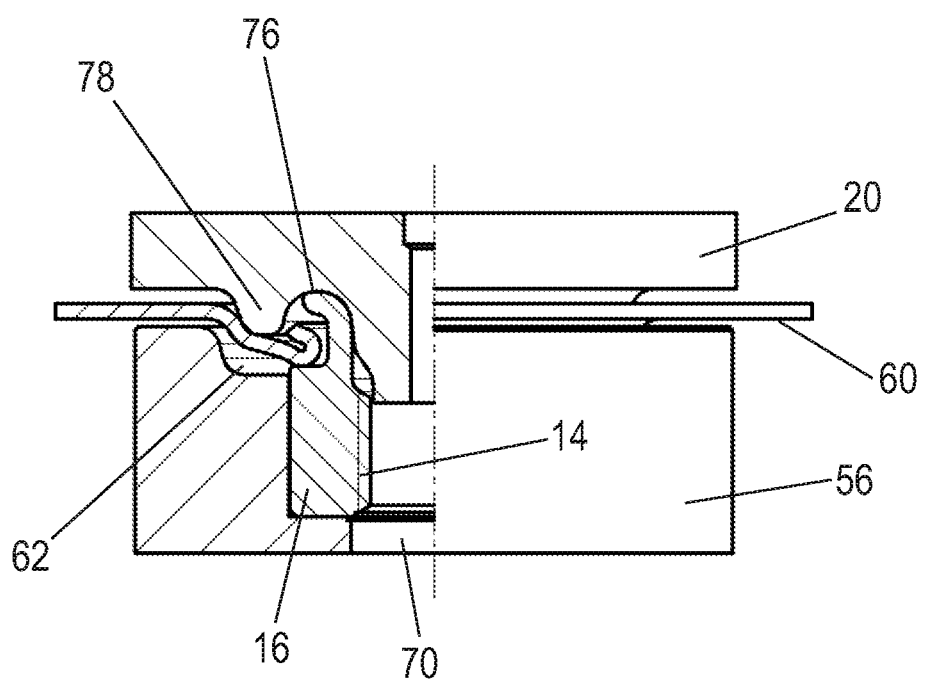
Figure 3H:
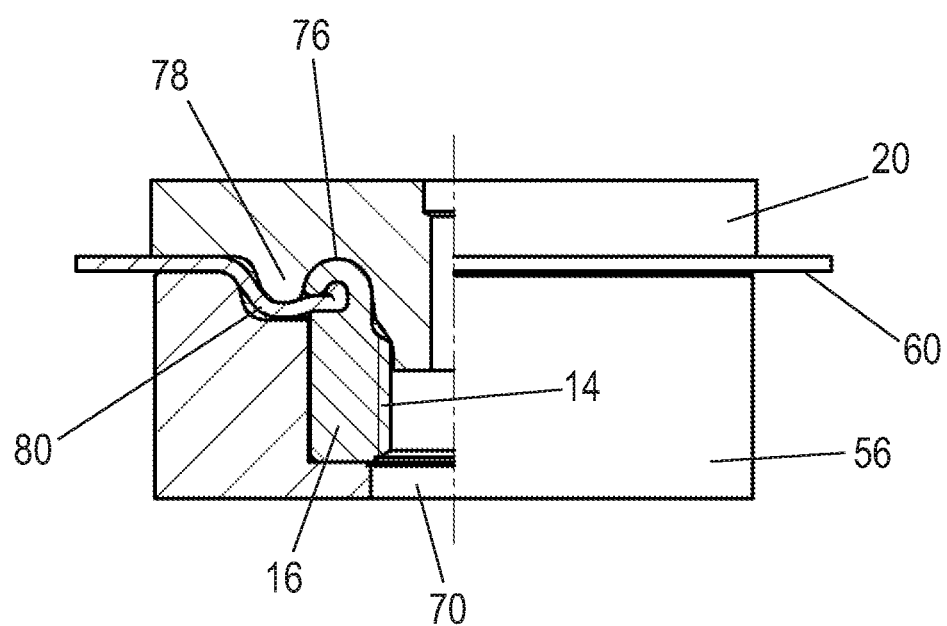
Figure 4:
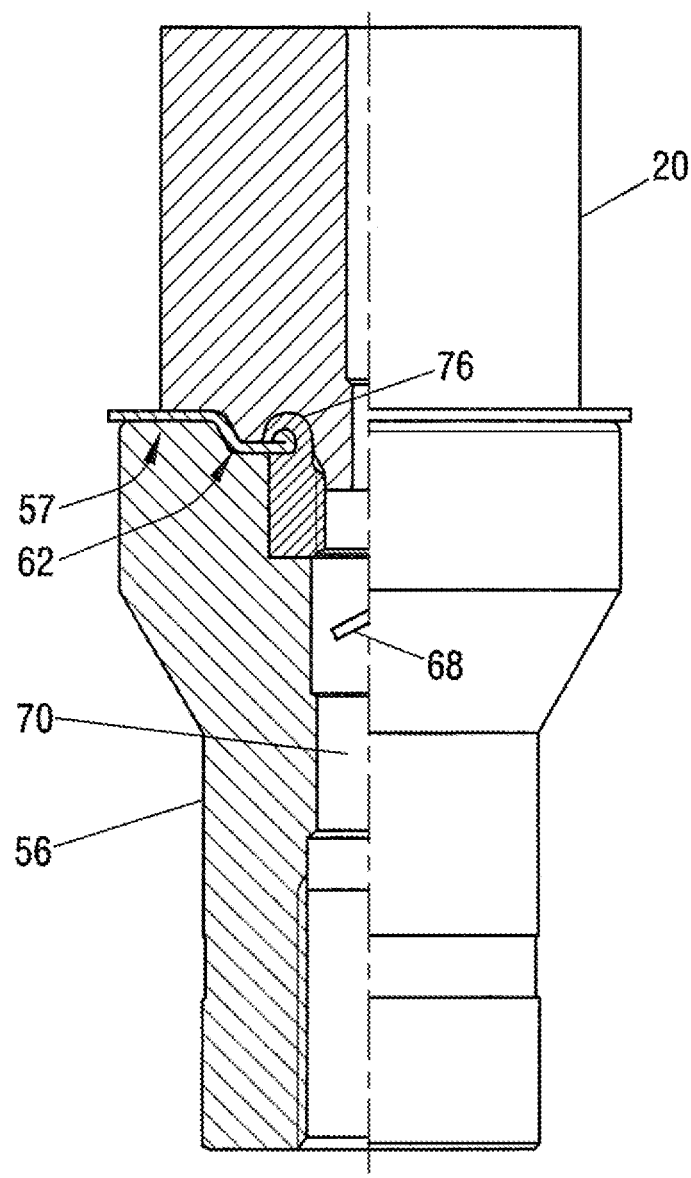
Figure 5:
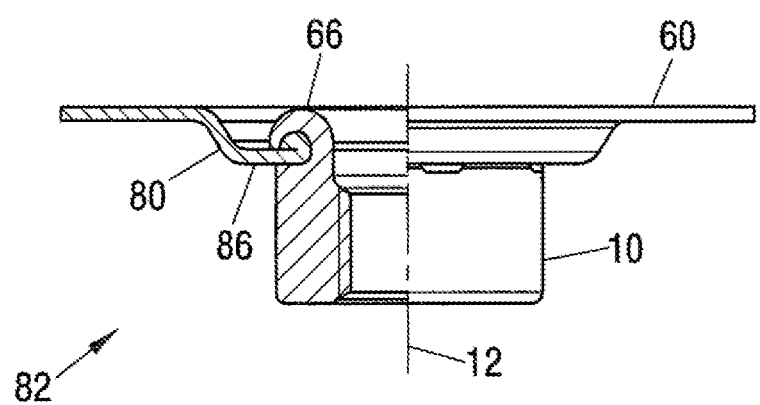
Figure 7A:
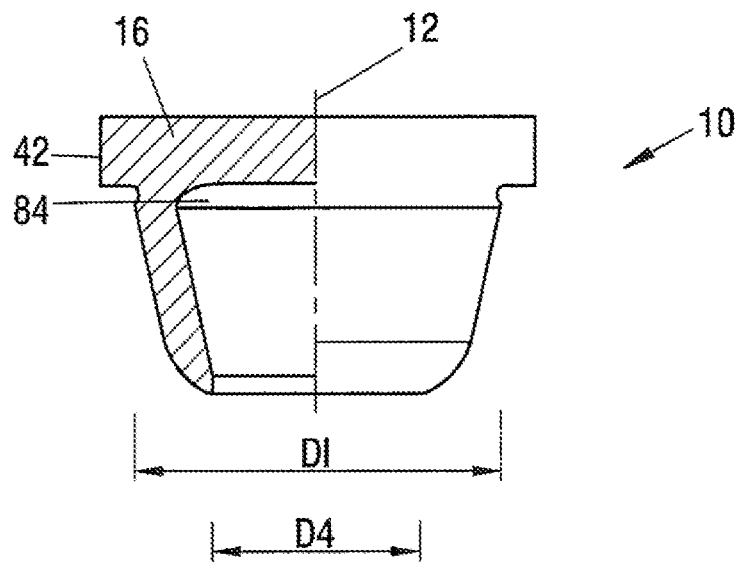
Figure 7B:
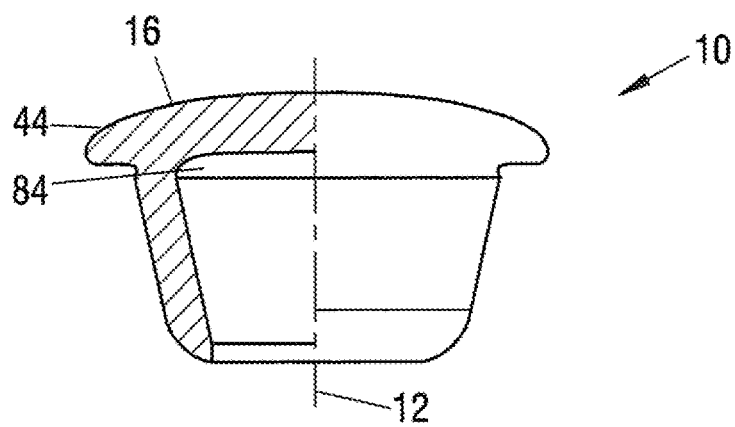
Figure 7C:
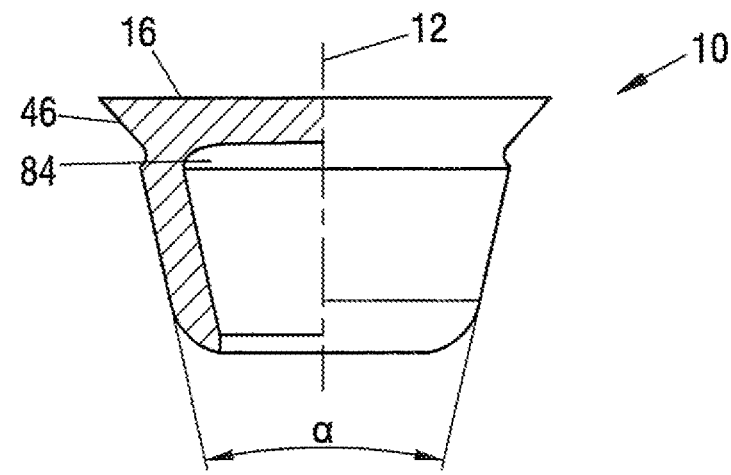

The invention will now be described in more detail with respect to embodiments and to the drawings in which are shown:

FIG. 1A a perspective representation of a first embodiment of a rivet element in the form of a nut element, FIG. 1B a side view of the self-piercing nut element of FIG. 1A partly sectioned in the longitudinal direction, FIG. 1C a half plan view in the longitudinal direction of the rivet element of the invention of FIG. 1A seen in the direction of its rivet section, FIGS. 2A-C representations corresponding to FIGS. 1A to 1C but of a second embodiment of the nut element of the invention, also here in the form of a nut element, FIG. 3A a representation of the apparatus with the setting head and the die button for the attachment of the rivet element in accordance with the invention of FIGS. 1A to 1C to a sheet metal part at the initial phase of the attachment, FIGS. 3B-3H figures similar to FIG. 3A but simplified showing different phases of the self-piercing attachment for the rivet element in accordance with the invention of FIGS. 1A to 1C to a sheet metal part, FIG. 4 a representation of the apparatus of FIG. 3A with the setting head and die button for the attachment of the rivet element of the invention in accordance with FIGS. 1A to 1C to a sheet metal part after the attachment to the sheet metal part, FIG. 4 being essentially the same as FIG. 3H but showing the full detail of FIG. 3A, FIG. 5 a side view partly sectioned in the longitudinal direction of the component assembly which arose in the representation of FIG. 4, FIGS. 6A-C representations in accordance with FIGS. 2A to 2C but of a third embodiment of the rivet element of the self-piercing rivet element in accordance with the invention, here in the form of a bolt element, and FIGS. 7A-C representations in accordance with FIG. 2B but of three different further embodiments of a self-piercing rivet element, here in the form of a rivet.

Referring to FIGS. 1A to 1C a self-piercing rivet element 10 is shown there in the form of a nut element having a central longitudinal axis 12, having a body part 16 with a thread cylinder 14 and having a hollow rivet section 18 which is to be pressed into an as yet unpierced component 60 (to be seen in FIGS. 3, 4 and 5). The rivet section 18 can be at least regionally dilated by means of a die button 20 (to be seen in FIG. 3A) and tapers in the direction of the central longitudinal axis and away from the body part. The designation "at least regionally" is intended to mean that the die button only has to lead to a pronounced dilation of the rivet section in the lower region of the rivet section, since the upper region is firmly inserted in the component and is not reshaped into a rivet bead. It should also be mentioned that the rivet section is not necessarily made tapering over its full length but could also have a cylindrical region of constant diameter which will be arranged adjacent to the body part of the rivet element. As a rule the axial length of the tapering section is larger than the axial length of any such cylindrical section.

The hollow rivet section 18 has a diameter D1 in the region of the transition to the body part 18 which is larger than the outer diameter D2 of the thread cylinder 14. Furthermore, the rivet section 18 has a closed peripheral wall 22 and at its free end an opening 24 having a diameter D4 which corresponds at least substantially to the core diameter D3 of the thread cylinder. The designation "closed peripheral wall" is intended to mean that the peripheral wall is not subdivided by slots into segments or tongues and is also not provided with holes. The opening 24 at the free end 26 of the rivet section 18 is bounded by a cylindrical wall 28, the lower end of which in FIG. 1A forms a piercing edge 30. As can be seen the rivet element 10 is formed here as a nut element and has an internal thread 32 which extends at least substantially coaxial to the central longitudinal axis 12, with the opening 24 being fractionally smaller than the core diameter D3 so that the slug generated by the rivet section can be removed without problem through the internal thread 32 as will be explained later in more detail.

As an alternative to this the rivet element 10 can be realized as a bolt element as is shown in FIGS. 6A to 6C. In this embodiment and also in all other embodiments of the invention the components which are of the same design or which satisfy the same function are provided with the same reference numerals and it will be understood that the description of features which are characterized by the same reference numerals applies to all embodiments, if nothing to the contrary is stated. For this reason the description will not be unnecessarily repeated.

In FIGS. 6A to 6C one can see that the thread cylinder 14 is here formed as a male thread 34 on a shaft part 36 of the rivet element 10, with the shaft part 36 extending away from the body part 16 of the rivet element at the side 38 of the rivet element remote from the rivet section 18. The external thread 34 also extends at least substantially coaxial to the central longitudinal axis 12. In this example the opening 24 of the rivet section can be slightly larger than the core diameter D3 of the thread cylinder. The reason for this is that the slug generated on piercing the rivet element into the sheet metal part can be forced through the opening 24 by means of the central post of the die button because it is not removed but rather is used to enhance the attachment of the rivet bolt to the sheet metal part and for this purpose is pressed and upset within the rivet section against the base of the body part and thereby increased in diameter.

As a further embodiment for a self-piercing rivet element 10 in accordance with the invention one can name a rivet element 10 in the form of rivet as shown in FIGS. 7A to 7C. A rivet of this kind is characterized in that the hollow rivet section 18 has its largest diameter D1 in the region of the transition 40 to the body part 16 and a close peripheral wall, with the rivet section 18 having its smallest diameter D4 at its free end 26 and there having a circular opening 24, with the tapering of the rivet section 18 forming an enclosed angle α with the central longitudinal axis 12 in the region between 20° and 100°, preferably between 30° and 60° and in particular between 40° and 50°. These angular values also apply to the rivet section 18 of the further embodiments of the rivet element 10 of all the figures.

The FIGS. 7A to 7C show three different head shapes for the rivet in accordance with the invention. In FIG. 7A the body part 16 or head part can be understood as a shallow cylinder 42, in FIG. 7B the body part 16 is formed as a rounded head part 44 whereas in FIG. 7C the body part is formed as a countersunk head 46.

In the embodiment of FIGS. 1 to 1C the outer side of the peripheral wall 22 of the rivet section 18 is at least substantially convexly rounded as seen sectioned in a longitudinal plane.

In the further embodiments the outer side of the peripheral wall 22 of the rivet section 18 extends at least substantially conically.

In all embodiments the peripheral wall of the rivet section has at least substantially constant wall thickness apart from the transition 40 to the head part and at its free end 26. This is however not essential, the wall thickness could with advantage be made thicker in the upper region adjacent to the transition 40 into the body part 16 than in the region of its free end. Between these positions the peripheral wall can become progressively thinner. In this connection the rivet section would be stiffer in its upper region and thus stiff within the component, which is favourable for the piercing of the component, and, in its lower region, it is more easily deformable, whereby the rivet bead can be more easily formed from this region which projects beyond the component.

The rivet element in accordance with the invention is preferably so designed that the side of the body part 16 adjacent to the transition 40 into the rivet section 18 is formed as a flange and, at least with a nut element in accordance with FIGS. 1A to 1C or FIGS. 2A to 2C or with a bolt element in accordance with FIGS. 6A to 6C, the flange is provided with features 50 providing security against rotation, here in the form of noses 52 and recesses 54. At this point it should be mentioned that no special demands are placed on the shape of the head part. For example, this could have a shape like an RND element of the company Profil Verbindungstechnik GmbH, as is shown in EP 1 116 891 B.

There a bolt shaped head part or body part is provided with an axial V-shaped groove which surrounds the rivet section and which is bridged at discrete uniformly distributed positions by noses providing security against rotation.

The method for the attachment of a rivet element in accordance with the invention, here in the form of the rivet element in accordance with FIGS. 1A to 1C to a component 60 in the form of a sheet metal part will now be described with reference to FIGS. 3A to 3H and 4. In this method a setting head 56 supports the rivet element 10 and above the rivet element 10 is a component 60 in the form of a sheet metal part. Above the sheet metal part is a die button 20 against which the component 60 can be pressed.

As seen in FIG. 3A the setting head 56 has a hollow cavity 58 for the reception of the body part 16 of the rivet element 10. Above the hollow cavity 58 there is a recess in the form of a depression 62 which, as will be explained later, serves to form a boss in the sheet metal part. The depression 62 merges into the flat end face 57 of the setting head 56. The setting head 56 is in this example accommodated in a lower tool of a press (not shown) and can be so designed—in manner known per se—that it supplies nut elements 10 one after the other to the press.

For each stroke of the press one rivet element or nut element 10 is introduced into a sheet metal part 60, or into a series of sheet metal parts arranged in a chain in a progressive tool. The details of the press are well known per se and, for the sake of simplicity, will therefore not be shown in the drawing. The nut element 10 here is arranged with the rivet section 18 projecting upwardly. The die button 20 is provided above the sheet metal part 60 and faces downwardly. It can be carried by an upper tool of the press or by an intermediate plate of the press (not shown). Likewise not shown, but frequently provided is a spring-loaded hold down member which would surround the setting head 56 and serve to press the sheet metal part against the tool of the press carrying the die button 20.

The die button 20 has a central post 64 which can be seen in all of FIGS. 3A to 3H and 4. In FIG. 3A the situation is shown when the press is open. The central post 64 is provided with a cylindrical region 66 with an outer diameter which corresponds to the inner diameter D4 of the opening 24.

The further FIGS. 3B to 3H show different phases in which the press progressively closes. In FIG. 3B the press has closed sufficiently that the central post 64 of the die button 20 presses against the upper side of the sheet metal part 60 and the lower side of the sheet metal part is supported on the upper free end of the rivet section 18. On further closing of the press the situation in accordance with FIG. 3C is achieved in which the central post 64 of the die button 20 has punched a slug 68 out of the sheet metal part 20 which is now able to fall freely through the thread cylinder 14 of the nut element and into the central passage 70 of the setting head 56. In FIG. 3D the divergent region 72 of the central post of the die button 20 above the cylindrical region 66 has dilated the opening in the sheet metal part resulting from the punching out of the slug 68 and also dilated the free end 69 of the rivet section 18 so that this is now pressed and located underneath the rim 67 of the dilated opening formed in the sheet metal part 20 as can be seen in FIG. 3D. One can also see in FIG. 3D that the raised ring 78 surrounding the recess 74 in the die button 20 is also in contact with the sheet metal part.

On further closing of the press the rivet section presses the rim region 67 of the hole in the sheet metal part upwardly into the U-shaped recess 74 of the die button 20 as can be seen in FIG. 3E. Further closing of the press in accordance with FIG. 3F results in the U-shaped recess 74 of the die button 20 causing the sheet metal part to be folded back on itself and serves simultaneously for the rivet section 18 to start to be rolled radially outwardly for the initial formation of the rivet bead 76.

It should be noted that the sheet metal part is not necessarily folded back on itself in the region of the rim 67 of the dilated opening. If the sheet metal part is relatively thicker than that shown in the drawings or is of higher strength, then folding back of the sheet metal part in the vicinity of the rim 67 does not necessarily occur.

In FIG. 3G the formation of the rivet bead 76 has progressed further and at the same time the raised ring portion 78 of the die button 20 has started to press the sheet metal part 20 into the depression 62 of the setting head 56 and against the end face 57 of the setting head. As shown in FIG. 3G the insertion operation is now almost completed.

In FIG. 3H, the pressing in process has been completed, the ring projection 78 of the die button 20 has pressed the sheet metal part 60 into the depression 62 of the setting head resulting the formation of the boss 80 in the sheet metal part 60 and the rivet section 18 has been formed into the complete rivet bead 76 which is located within the concave side of the boss 80. The body part 16 of the rivet element sits on the raised side of the boss, i.e. the bottom side as shown in FIG. 3H.

It will be noted that the piercing slug 68, which arises through the cutting action between the free end 26 of the rivet section 18 and the central post 64 of the die button 20 being pressed into the rivet section, falls (as seen in FIG. 3C) through the central passage 70 of the rivet element 10, i.e. through the thread cylinder 14 and into the central passage 70 of the setting head through the action of gravity or optionally with the aid of the blast of compressed air which can be supplied through the central passage of the die button. It can be seen from the drawings that the cylindrical region 68 of the central post 64 is followed by the region 72 which diverges from the cylindrical region 68 away from the cylindrical region and which serves for the dilation of the hollow rivet section. The divergent region of the central post merges into a U-shaped recess 74 which, after the piercing of the component and the dilation of the rivet section by the further exertion of pressure on the die button, shapes the rivet section 18 into a rivet bead 76 as can be seen in completed form of the component assembly visible in FIGS. 4 and 5.

As noted above FIGS. 3A and 4 show the details of the setting head 56 and of the die button 20 used to insert the rivet element into the sheet metal part 60. Furthermore it can see from FIGS. 3 and 4 that the U-shaped recess 74 merges at its radially outer side into the raised ring portion 78 which surrounds the recess 74 and which cooperates with the depression 62 of the setting head for the formation of the boss 80 of the sheet metal part 60 (which can be readily seen in FIG. 5). In this way the sheet metal part is reshaped into a boss which lines the depression 62 in FIG. 4.

One important consideration for the existence of the present invention is that the rivet element 10, and in particular its rivet section 18, first operates as a hole forming die for the punching of the hole in the sheet metal part 60 and cooperates with the central post 64 of the die button 20 which acts as a punch for the punching of the hole rather than as a die button. After the punching of the hole in the sheet metal part, the die button 20 then takes on the traditional role of a die button, i.e. to form the rivet section into a rivet bead.

The result of the work within the press is the component assembly 82 in accordance with FIG. 5. This figure shows a side view and a half section of the component assembly. When one talks here of a component, then this is normally present in the form of a sheet metal part. It is however not precluded that the component 60 could consist of a plastic material, for example in the form of a fiber reinforced composite material which can likewise be considered and which can also be pierced by the rivet element in accordance with the invention and indeed in particular if suitable measures are taken to heat the plastic material to soften it.

The component assembly 82 consists of the rivet element 10 in combination with the component 60, in particular a metallic component or sheet metal part, wherein, when the rivet element is formed as a nut element, the slug 68 which has arisen by the self-piercing introduction of the rivet element 10 in a region of the element 24 is disposed of through the hollow thread cylinder 14 and, when the rivet element is designed as a bolt element or as a rivet, the slug 68 which has arisen in the region of the opening is accommodated in upset matter in the hollow rivet section 18 adjacent to the base 84 of the body part 16 (not shown).

The rivet section 18 which has been shaped into a rivet bead lies at the side of the sheet metal part 60 opposite to the body part 16 and forms, together with the flange or with the lower side of the body part a U-shaped recess in which the sheet metal part 60 is clamped in the ring-like marginal region 67 of the aperture caused by the rivet section.

As can likewise be seen from FIG. 5 the rivet section 18 of the rivet element 10 which has been shaped into a rivet bead 76 is accommodated within a boss 82 of the component, that is to say the body part 16 of the rivet element 10 sits on the raised side 86 of the boss.

It will be understood that the processing of the piercing bolt in accordance with FIGS. 6A to 6C and the self-piercing rivet elements in accordance with FIGS. 7A to 7C takes place analogously to that described for the nut elements with reference to FIGS. 3 and 4.

Furthermore it should be pointed out that the arrangement of the setting head 56 in the lower tool of a press and the arrangement of the die button in the upper tool of a press is in no way essential. The setting head 56 could equally well be incorporated facing upwardly in a intermediate plate of the press and the die button could be arranged facing downwardly in an upper tool of a press. As an alternative to this the setting head could also be mounted facing downwardly at the upper tool of a press or at the intermediate plate of a press and the die button would then be arranged facing upwardly in the intermediate plate of the press or in the lower tool of the press. When using a power-operated pair of tongs the setting head would be carried by one arm of the tongs whereas the die button is attached to the other arm. When using a robot this could carry either the setting head or the die button and could press this towards the other respective fixedly mounted part, i.e. the die button or the setting head.

Finally it will be pointed out that when in this application there is talk of "from above" or "from below" or of other geometrical relationships it is always related to the embodiments shown in the drawings and should in no way be understood as a restriction.

REFERENCE NUMERAL LIST 10 rivet element
12 central longitudinal axis of the rivet element
14 thread cylinder
16 body part of the rivet element
18 rivet section of the rivet element
20 die button
22 peripheral wall of the rivet section
24 opening
26 free end of the rivet section
28 cylindrical wall
30 piercing edge
32 internal thread of a nut element
34 external thread, male thread
36 shaft part of the rivet element
38 side of the body part of the rivet element 10
40 transition of the rivet section into the body part 16
42 head part or body part in the form of a flat cylinder
44 body part in the form of a rounded head part
46 body part in the form of a counter-sunk head
48 flange
50 features for providing security against rotation
52 noses
54 semi-circular cut-outs
56 setting head
57 flat end face of the setting head
58 hollow cavity of the setting head
60 component
62 depression of the setting head
64 central post of the die button
66 cylindrical region of the central post of the die button
67 rim of hole punched in the sheet metal part 60
68 slug
69 free end of the rivet section 18
70 central passage of the setting head 56
72 divergent region of the die button
74 U-shaped recess of the die button 20
76 rivet bead
78 raised ring portion of the die button
80 boss
82 component assembly
84 base of the body part 16
86 raised side of the boss 80
D1 diameter of the rivet section adjacent to the body part
D2 outer diameter of the thread cylinder
D3 core diameter of the thread cylinder
D4 diameter of the opening 24
α enclosed angle of the conical rivet section

The invention claimed is:

1. A self-piercing rivet element (10) having a central longitudinal axis (12), a body part (16) with a thread cylinder (14) and a hollow rivet section (18) for being pressed into a non-pre-pierced component (60), wherein the rivet section (18) is formed to be dilated at least regionally by means of a die button (20) and tapers in the direction of the central longitudinal axis (12) away from the body part (16), wherein the hollow rivet section (18) has a diameter (D1) in the region of the transition into the body part (16) which is larger than the outer diameter of the thread cylinder (D2) and has a closed peripheral wall which extends longitudinally to an opening (24) at its free end (26) which corresponds in diameter (D4) at least substantially to the core diameter (D3) of the thread cylinder (14).

2. A rivet element (10) in accordance with claim 1, wherein the rivet element (10) is a nut element having an internal thread (14) which extends at least substantially coaxially to the central longitudinal axis (12), with the opening (24) at the free end (69) of the rivet section (18) being fractionally smaller than the core diameter (D3).

3. A rivet element (10) in accordance with claim 1, wherein the outer side of the peripheral wall (22) of the rivet section (18) is at least substantially convexly rounded when sectioned in a longitudinal plane.

4. A rivet element (10) in accordance with claim 1, wherein the peripheral wall (22) of the rivet section (18) has an at least substantially constant wall thickness up to its free end (26), apart from the transition into the body part (16).

5. A rivet element (10) in accordance with claim 1, wherein the side (38) of the body part (16) adjacent to the transition into the rivet section (18) is formed as a flange (47) and is optionally provided with features (50) providing security against rotation.

6. A component assembly (82) comprising a rivet element (10) in accordance with claim 1 in combination with a component (60), in particular with a metallic component or a sheet metal part, wherein when designed as a nut element, a piercing slug (68) arising through a self-piercing introduction of the rivet element (10) in the region of the opening (24) is disposed of through the hollow thread cylinder (14) and, when formed as a bolt element or a rivet, the piercing slug (68) arising in the region of the opening (24) is accommodated in upset manner in the hollow rivet section (18) adjacent to the body part (16).

7. A component assembly (82) in accordance with claim 6, wherein the rivet section of the rivet element formed into a rivet bead (76) is accommodated in a boss (80) of the component (60) and the body part (16) of the rivet element sits on a raised side of the boss (80).

8. A method for the attachment of the rivet element (10) in accordance with claim 1 to a component or sheet metal part (60) using a die button (20) which is arranged on the other side of the component, wherein the die button (20) is provided with a central post (70) having a cylindrical region (66) with an outer diameter which corresponds to the inner diameter (D4) of the opening (24) and with which, on the exertion of pressure onto the rivet element (10) in the direction towards the component (60) and the die button (20) serves for the piercing of a slug (68) which is pressed into the rivet section (18), in that the cylindrical region (66) of the central post (70) is followed by a region (72) diverging in diameter away from the cylindrical region (66) which serves for a dilation of the hollow rivet section (18) and in that the divergent region (72) of the central post (70) merges into a U-shaped recess (74) which, after the piercing of the component (60) and the dilation of the rivet section (18) and on the exertion of further pressure on the rivet element (10), shapes the rivet section (18) into a rivet bead (76).

9. A method in accordance with claim 8, wherein the body part (16) of the rivet element (10) is accommodated in a hollow cavity (58) of a setting head (56) which merges via a depression (62) forming a boss (80) into the flat end face (57) of the setting head (56), whereby on the exertion of pressure onto the rivet element by means of the setting head (56) the component (60) is reshaped into the form of a boss (80).

\* \* \* \* \*